(12) United States Patent
Branca

(10) Patent No.:  US 12,587,095 B2
(45) Date of Patent:  Mar. 24, 2026

(54) CHARGE PUMP DEVICE

(71) Applicant: STMicroelectronics International N.V., Geneva (CH)

(72) Inventor: Xavier Branca, Sassenage (FR)

(73) Assignee: STMicroelectronics International N.V., Geneva (CH)

( * ) Notice: Subject to any disclaimer, the term of this patent is extended or adjusted under 35 U.S.C. 154(b) by 28 days.

(21) Appl. No.: 18/616,539

(22) Filed: Mar. 26, 2024

(65) Prior Publication Data

US 2024/0333148 A1  Oct. 3, 2024

(30) Foreign Application Priority Data

Mar. 30, 2023  (FR) ...................................... 2303132

(51) Int. Cl.
H02M 3/07  (2006.01)
G01S 17/894  (2020.01)

(52) U.S. Cl.
CPC ............. H02M 3/07 (2013.01); G01S 17/894 (2020.01)

(58) Field of Classification Search
None
See application file for complete search history.

(56) References Cited

U.S. PATENT DOCUMENTS

| | | | | |
|---|---|---|---|---|
| 4,961,007 A | * | 10/1990 | Kumanoya | ............. G05F 3/205 |
| | | | | 327/566 |
| 6,055,168 A | * | 4/2000 | Kotowski | ............... H02M 3/07 |
| | | | | 363/60 |

| | | | | |
|---|---|---|---|---|
| 6,504,422 B1 | * | 1/2003 | Rader | ...................... H02M 3/07 |
| | | | | 327/536 |
| 6,927,441 B2 | * | 8/2005 | Pappalardo | ............. H02M 3/07 |
| | | | | 257/299 |
| 8,193,853 B2 | * | 6/2012 | Hsieh | ...................... H02M 3/07 |
| | | | | 363/60 |
| 8,692,607 B2 | * | 4/2014 | Yoshida | ................. G11C 5/145 |
| | | | | 363/59 |
| 8,704,587 B2 | * | 4/2014 | Ramanan | ............... G11C 5/145 |
| | | | | 363/59 |
| 9,356,506 B1 | | 5/2016 | Ho | |
| 9,973,080 B2 | * | 5/2018 | Teh | ......................... H02M 3/07 |
| 10,680,517 B1 | | 6/2020 | Qiao | |
| 2005/0047181 A1 | * | 3/2005 | Yamamoto | .............. H02M 3/07 |
| | | | | 363/60 |

(Continued)

OTHER PUBLICATIONS

INPI Search Report and Written Opinion for priority application, FR Appl. No. 2303132, report dated Oct. 13, 2023, 12 pgs.

*Primary Examiner* — Thomas J. Hiltunen
(74) *Attorney, Agent, or Firm* — Crowe & Dunlevy LLC

(57)  ABSTRACT

A device includes charge pumps, wherein each charge pump has an input receiving an input voltage, another input receiving a periodic control signal and an output delivering an output voltage. Each charge pump is selectively enabled or disabled. A first circuit delivers an error signal based on a difference between the output voltage and a reference voltage. A second circuit changes an operating parameter of the charge pumps on the basis of the error signal. A third circuit compares a current value of the operating parameter with two thresholds and, based on the result of the threshold comparisons, controls one of an increase in, a decrease in, and a retention of a number of enabled charge pumps.

21 Claims, 5 Drawing Sheets

(56)            References Cited

U.S. PATENT DOCUMENTS

| | | | |
|---|---|---|---|
| 2009/0237046 A1 | 9/2009 | Hsieh et al. | |
| 2012/0169405 A1* | 7/2012 | Choi ....................... | H02M 3/07 |
| | | | 327/536 |
| 2014/0022005 A1* | 1/2014 | Ramanan ................ | H02M 3/07 |
| | | | 327/536 |
| 2018/0017632 A1* | 1/2018 | Moore .................... | H02M 3/07 |

* cited by examiner clk

100

104

CP1

102

100

104

CP2

102

120

102

104

128

CP3

VDD

100

110

126

100

104

Vref

Err

CP4

Vin

108

Vout

122

102

124

106

102

104

CP5

100

102

104

CP6

100

Time-of-flight sensor circuit

Pixel array

Charge Pump Device

Vout

| SPAD | SPAD | SPAD |
|------|------|------|
| SPAD | SPAD | SPAD |
| SPAD | SPAD | SPAD |

CHARGE PUMP DEVICE

PRIORITY CLAIM

This application claims the priority benefit of French Application for Patent No. 2303132, filed on Mar. 30, 2023, the content of which is hereby incorporated by reference in its entirety to the maximum extent allowable by law.

TECHNICAL FIELD

The present disclosure generally relates to electronic circuits, for example integrated circuits, and more particularly to devices or circuits for providing a direct current (DC) supply voltage.

BACKGROUND

Numerous known devices allow a DC supply voltage to be delivered. Switched mode power supply (SMPS), charge pump devices, low drop out regulators (LDO) are examples of such devices.

Known charge pump devices comprise several charge pumps connected in parallel. Each charge pump of such a device receives a same input voltage shared between all the charge pumps, and delivers an output voltage on a node connected to the outputs of all the charge pumps.

However, these known devices comprising several parallel-connected charge pumps have several drawbacks, for example as regards their power consumptions, for example, their static consumptions linked to the switching into the charge pumps.

There is a need to address all or some of the drawbacks of the known charge pump devices, particularly the known devices comprising several charge pumps connected in parallel and configured to deliver a DC output voltage of the device.

SUMMARY

One embodiment provides a device comprising: charge pumps each having a first input connected to a first node configured to receive an input voltage of the charge pumps, a second input configured to receive a periodic control signal for controlling the switching of the charge pumps and an output connected to a second node configured to deliver an output voltage of the device, each charge pump being configured to be selectively enabled or disabled; a first circuit configured to deliver a signal indicating an offset between the output voltage and a reference voltage; a second circuit configured to change an operating parameter of said charge pumps on the basis of said signal; and a third circuit configured to compare a current value of said parameter with a first threshold and with a second threshold, and, based on the result of the comparisons, to control one of an increase in a number of enabled charge pumps, a decrease in the number of enabled charge pumps, and a retention of the number of enabled charge pumps.

According to an embodiment, the parameter belongs to the group comprising the frequency of the control signal, the input voltage, the threshold of MOS transistors configured to implement the switching into the charge pumps, and gate-source voltage levels of said transistors.

According to an embodiment, the third circuit is configured to control: an increase in the number of enabled charge pumps when the result of the comparisons indicates that the current value is on a first same side of said first and second thresholds; a retention of the number of enabled charge pumps if the result of the comparisons indicates that the current value is comprised between the first and second thresholds; and a decrease in the number of enabled charge pumps if the result of the comparisons indicates that the current value is on a second same side of said first and second thresholds.

According to an embodiment, the third circuit comprises a first comparator for comparing the current value of the parameter with the first threshold, a second comparator for comparing the current value of said parameter with the second threshold, and a processing circuit configured to receive an output signal from each of the first and second comparators and to deliver, on the basis of these output signals, a signal selecting the state of each of the charge pumps among the enabled state and the disabled state.

According to an embodiment, said parameter is selected among the frequency of the control signal and the input voltage, the third circuit being configured to control: an increase in the number of enabled charge pumps if the result of the comparisons indicates that the current value is higher than the first and second thresholds; a retention of the number of enabled charge pumps if the result of the comparisons indicates that the current value is comprised between the first and second thresholds; and a decrease in the number of enabled charge pumps if the result of the comparisons indicates that the current value is less than the first and second thresholds.

According to an embodiment, the parameter is the input voltage, the frequency of the control signal being preferably constant.

According to an embodiment, the second circuit is configured to increase the input voltage if the output voltage is less than the reference voltage and to decrease the input voltage if the output voltage is higher than the reference voltage.

According to an embodiment: the first circuit comprises an operational amplifier having a non-inverting input configured to receive the output voltage, an inverting input configured to receive the reference voltage, and an output configured to deliver the signal indicating the offset between the output voltage and the reference voltage; and the second circuit comprises a P-channel MOS transistor connected between the first node and a node configured to receive a supply potential, the gate of the transistor being connected to the output of the operational amplifier of the first circuit.

According to an embodiment, the parameter is the frequency of the control signal, the input voltage being preferably constant.

According to an embodiment, the second circuit is configured to increase the frequency if the output voltage is less than the reference voltage and to decrease the frequency if the output voltage is higher than the reference voltage.

According to an embodiment, the third circuit is configured, when the result of the comparisons corresponds to an increase in the number of enabled charge pumps, to launch a first delay and to control said increase at the end of the first delay only if the result of the comparisons is the same as at the start of the first delay.

According to an embodiment, the third circuit is configured, when the result of the comparisons corresponds to a decrease in the number of enabled charge pumps, to launch a second delay and to control said decrease at the end of the second delay only if the result of the comparisons is the same as at the start of the second delay.

Another embodiment provides a time-of-flight sensor comprising a device as previously described, and an array of pixels comprising each a single photon avalanche diode, the device being configured to supply the pixel array with the output voltage thereof.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the various known electronic devices, for example integrated circuits, and the various known systems or applications in which a charge pump device may be provided to deliver a DC supply voltage have not been detailed, the herein described embodiments and alternative embodiments of charge pump devices being compatible with these known circuits, systems and applications.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figures 1, 6:
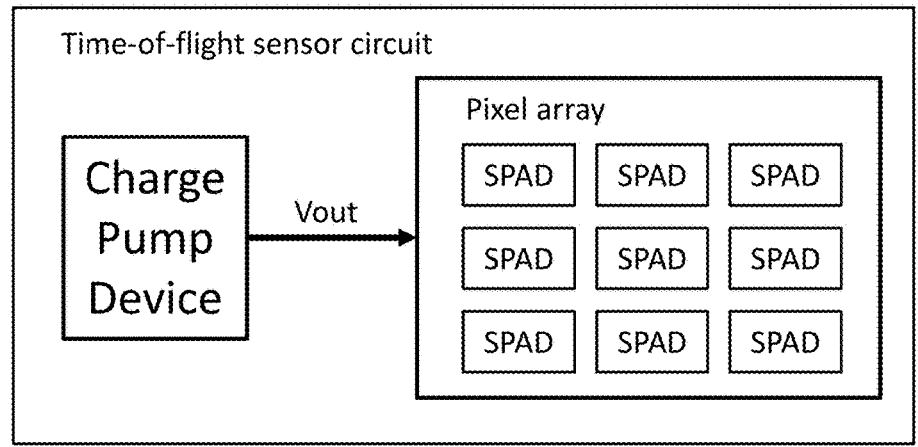
FIG. 1 schematically illustrates in part in block form, an example of a charge pump device.
FIG. 6 schematically illustrates a block form diagram for a sensor using the charge pump device of any of FIGS. 3, 4 and 5.

FIG. 1 schematically illustrates in part in block form, an example of a charge pump device 1. The device 1 is configured to deliver a DC voltage Vout.

The device 1 comprises N charge pumps CPi, with N being an integer higher than or equal to 2, preferably higher than or equal to 3, and i being an integer index from 1 to N. In the example of FIG. 1, N is equal to 6 (the device including charge pumps CP1, CP2, CP3, CP4, CP5, CP6), on the understanding that the number N can practically be different from 6, for example higher than 6.

Each charge pump CPi comprises an input 100 configured to receive an input voltage Vin of the charge pumps CPi. Each charge pump CPi is a switched-capacitor charge pump. Thus, each charge pump CPi comprises an input 102 configured to receive a clock signal clk. The signal clk is a periodic signal for controlling the charge pumps CPi, and more particularly the switching into each charge pump CPi. The signal clk is the same for all the charge pumps CPi. Each charge pump CPi comprises an output 104 configured to deliver an output voltage of the charge pump.

The charge pumps CPi are connected in parallel with each other. In other words, all the charge pumps CPi have their inputs 100 connected to a same node 106 configured to receive the input voltage Vin of the charge pumps CPi, and all the charge pumps have their outputs 104 connected to a same node 108 configured to deliver the voltage Vout of the device 1.

Each charge pump CPi is configured to deliver an output voltage Vout at a value equal to K times the value of the input voltage Vin thereof. Preferably, the charge pumps CPi are identical to each other.

The device 1 further comprises a circuit 110. The circuit 110 is configured to deliver a signal Err, for example a voltage, indicating a value of an offset between the value of the voltage Vout and the value of a reference voltage Vref. The circuit 110 receives, for example, the voltage Vout or a signal indicating the value of the voltage Vout, and the voltage Vref or a signal indicating the value of the voltage Vref.

As an example, the circuit 110 comprises an operational amplifier 112 having a first input, for example the inverting input (−) in FIG. 1, configured to receive the voltage Vref, a second input, for example the non-inverting input (+) in FIG. 1, connected to the node 108 to receive the voltage Vout, and an output configured to deliver the signal Err.

As an alternative example, the circuit 110 comprises the operational amplifier 112, but its first input receives a signal indicating the value of the reference voltage Vref and its second input receives a signal indicating the value of the voltage Vout.

Based on the signal Err, the device 1 controls an operating parameter of the charge pumps CPi, so as to maintain the voltage Vout equal to the voltage Vref. To this end, the device 1 comprises a circuit 120 configured to change (or adapt or adjust) this operating parameter according to the signal Err.

In the example in FIG. 1, this parameter is the value of the voltage Vin. Preferably, the frequency of the signal clk, which is another operating parameter of the charge pumps CPi, is then constant, or at least does not depend on the signal Err.

The circuit 120 is then configured to increase the voltage Vin if the voltage Vout is less than the voltage Vref, and to decrease the voltage Vin if the voltage Vout is higher than the voltage Vref. For example, the circuit 120 receives the signal Err on an input 122 of the circuit 120, and delivers voltage Vin on an output 124 of the circuit 120, the output 124 being connected to the node 106. In other words, the circuit 120 delivers the voltage Vin in this example.

As an example, the circuit 120 comprises a P-channel MOS ("Metal Oxide Semiconductor") transistor, or PMOS transistor, 126. The transistor 126 is connected between a node 128 configured to receive a supply voltage VDD, and the output 124 of the circuit 120, that is the node 106 in this example. The transistor 126 is controlled based on the signal Err, for example by the signal Err. For example, the transistor 126 has its source connected to the node 108, its drain connected to the output 124, and its gate connected to the input 122 of the circuit 120.

Each charge pump CPi has an output impedance that restricts the maximum quantity of current this charge pump CPi can deliver at node 108 to maintain the voltage Vout at a same value as the voltage Vref. Providing several parallel charge pumps allows the maximum quantity of current the device 1 can deliver at node 108 to be increased as compared to a device 1 that would comprise only a single charge pump CPi. Thus, the number N of charge pumps CPi is determined by the maximum consumption of a load connected to node 108 and supplied with voltage Vout, for example in the worst PVT ("Process Voltage Temperature") conditions.

However, increasing the number N of charge pumps CPi of the device 1 to guarantee that the device 1 will be able to supply the load in the worst PVT conditions, has the drawback of increasing the consumption of the device 1, for example since it increases the static consumption of the device 1 related to the power loss or leakages in the charge pumps CPi.

When the load supplied by the device 1 is configured to operate according to at least two supply modes, for example a low power mode and a nominal consumption mode, in other non-illustrated examples of devices 1, one provides disabling one or more charge pumps only on the basis of the supply mode in which the load is. Particularly, in the supply mode where the load is supposed the most consuming, for example the nominal consumption mode, all the charge pumps CPi are enabled, although in this supply mode the load is not continuously at its maximal consumption in the worst PVT conditions. Indeed, the knowledge of the supply mode of the load gives only an indication of a range of consumption values in which the current value of the load consumption is, without giving the current value of the load consumption.

Thus, despite the hereinabove described adaptation of the number of enabled charge pumps in the device 1 according to a supply mode of the load, the number of enabled charge pumps is most of the time higher than the number of charge pumps that would be necessary to meet the current consumption of the load.

One proposes herein to adapt the number of enabled charge pumps CPi in a device having a charge pump of the type described in relation with FIG. 1, not on the basis of the knowledge of a supply mode of the load supplied by the device, but on the basis of the current consumption of the load. To this end, one provides for comparing with two thresholds the current value of an operating parameter of the charge pumps that is adapted according to the signal Err and that is an image (or is representative) of the current (or instant) consumption of the load, and for adapting the number of enabled charge pumps according to the result of such comparisons.

Example embodiments of such a device will now be described in relation with FIGS. 2 and 3.

Figure 2:
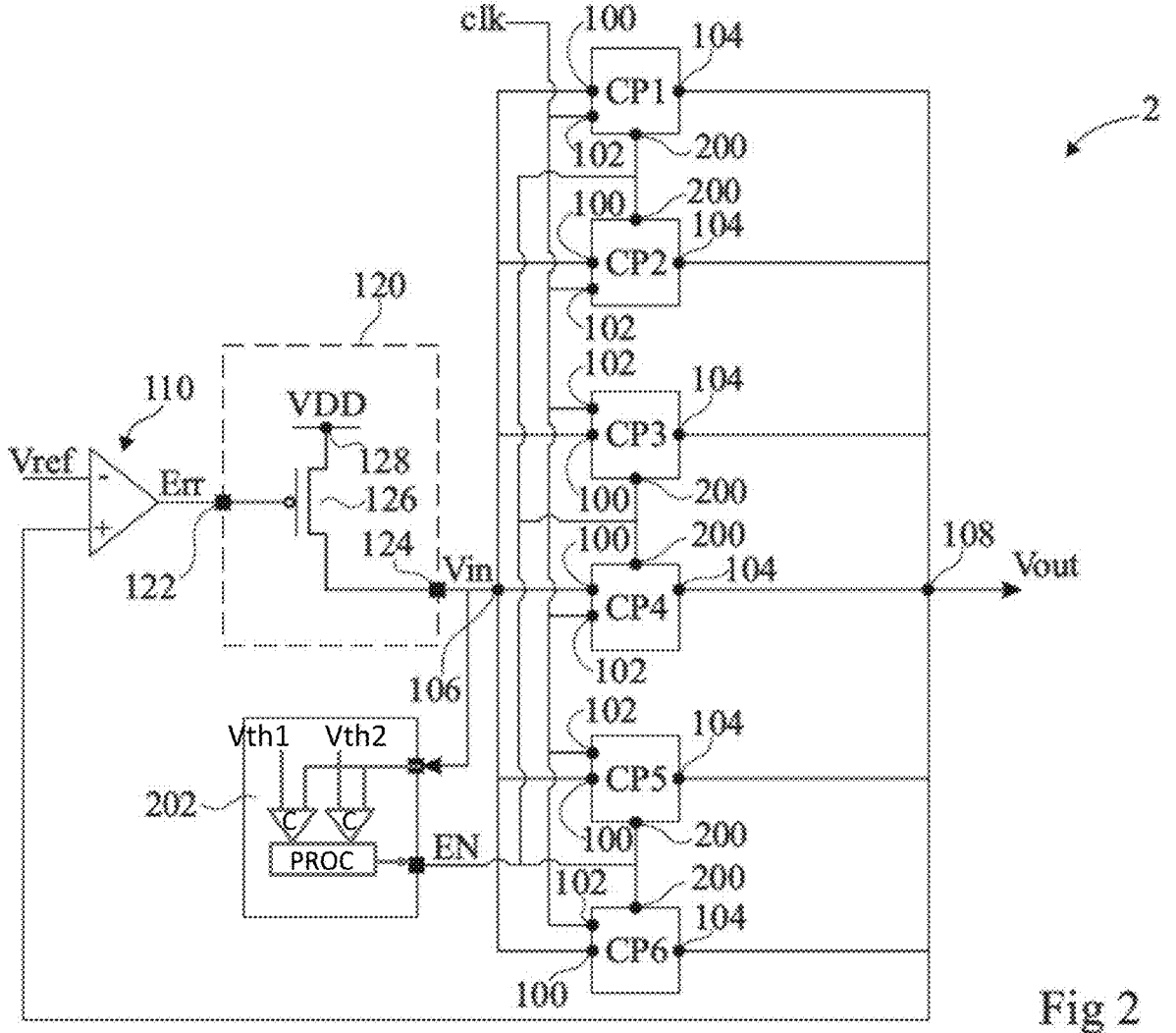
FIG. 2 schematically illustrates in part in block form, an example embodiment of a charge pump device.

FIG. 2 schematically illustrates in part in block form, an example embodiment of a device 2 having a charge pump.

Device 2 is similar to the previously described device 1, and only the differences between these two devices 1 and 2 are here highlighted. Thus, unless specified otherwise, all that was indicated relative to device 1 applies to device 2.

As compared to device 1, the charge pumps CPi of device 2 are configured to be selectively each enabled or disabled. For example, as compared to the charge pumps CPi of device 1, the charge pumps CPi of the device 2 comprise each a further input 200 configured to receive a signal EN indicating to this charge pump whether it should be enabled or disabled. As an example, the signal EN is a multi-bit digital signal common to all the charge pumps CPi, the different combinations of states of the bits of the signal EN indicating, or controlling, which charge pumps CPi are enabled, and which charge pumps CPi are disabled from the N charge pumps CPi of the device 2. For example, the signal EN comprises N bits, each bit corresponding to a charge pump CPi and controlling the enabled state, respectively disabled state, of the charge pump when the bit is in a first binary state, respectively in a second binary state.

As compared to device 1, device 2 further comprises a circuit 202.

The circuit 202 is configured to compare the current value of the operating parameter of the charge pumps CPi (which are being adapted according to the signal Err as described above) with a first threshold Vth1 and with a second threshold Vth2. For example, the circuit 202 receives a signal indicating the current value of this parameter.

The circuit 202 is further configured based on the results of the comparisons, to control one of an increase in a number of enabled charge pumps CPi, a decrease in the number of enabled charge pumps CPi, and a retention of the number of enabled charge pumps CPi. The circuit 202 thus delivers the signal EN on an output 204 of the circuit 202. In other words, according to the result of the comparisons, the circuit 202 implements either a decrease in the number of enabled charge pumps CPi, or an increase in the number of enabled charge pumps CPi, or a lack of change of this number of enabled charge pumps CPi. In yet other words, the circuit 202 is configured to adapt the number of enabled charge pumps CPi according to the result of the comparisons of the current value of the operating parameter of the charge pumps CPi with the thresholds Vth1 and Vth2.

More particularly, the two thresholds Vth1 and Vth2 define three ranges of values, namely a first range of values having all the values thereof less than both thresholds Vth1 and Vth2, a second range of values having all the values thereof comprised between the two thresholds Vth1 and Vth2, and a third range of values having all the values thereof higher than both thresholds Vth1 and Vth2. The result of the comparisons, with the two thresholds Vth1 and Vth2, of the current value of the operating parameter of the charge pumps CPi allows the circuit 202 to determine whether this current value is in the second range, the circuit 202 then not changing the number of enabled charge pumps CPi, if this current value is in one of the first and third ranges of values, the circuit 202 then increasing the number of enabled charge pumps CPi, or if this current value is in the other of the first and third ranges of values, the circuit 202 then decreasing the number of enabled charge pumps CPi.

In other words, the circuit 202 is configured to control: an increase in the number of enabled charge pumps CPi as the result of the comparisons indicates that the current value of the parameter is on a same first side of the thresholds Vth1 and Vth2, for example when the current value is higher, respectively less, than both thresholds Vth1 and Vth2; a retention of the number of enabled charge pumps CPi if the result of the comparisons indicates that the current value of is comprised between the two thresholds Vth1 and Vth2; and a decrease in the number of enabled charge pumps CPi if the result of the comparisons indicates that the current value of the parameter is on a same second side of the thresholds Vth1 and Vth2, for example when the current value is less, respectively higher, than both thresholds Vth1 and Vth2.

In the example of FIG. 2, the operating parameter of the charge pumps CPi being adapted according to the signal Err and the current value of which is compared with the thresholds Vth1 and Vth2 to adapt the number of enabled charge pumps CPi is the voltage Vin at the output node 124 of circuit 120.

In this example, if the load supplied by the device 2 consumes too much in view of the number of enabled charge pumps CPi of the device 2, the voltage Vout will drop below the voltage Vref, which causes an increase in the value of voltage Vin. Conversely, if the load supplied by the device 2 consumes not enough in view of the number of enabled charge pumps CPi, the voltage Vout will rise above the voltage Vref, which causes a decrease in the value of voltage Vin.

Thus, in this example, if the constant value of the voltage Vin is higher than the thresholds Vth1 and Vth2, that means that the load consumes too much for the number of enabled charge pumps CPi, and the circuit 202 then controls an increase in this number of enabled charge pumps CPi. Conversely, if the constant value of the voltage Vin is less than the thresholds Vth1 and Vth2, that means that the device 2 delivers too much power to the load as compared to the consumption of this latter, and the circuit 202 then controls a decrease in the number of enabled charge pumps CPi. In the case where the number of enabled charge pumps is adapted to the consumption of the load, the voltage Vout changes little as compared to the voltage Vref, resulting in the current value of the voltage Vin being relatively stable and remains comprised between the thresholds Vth1 and Vth2, the circuit 202 then not changing the number of enabled charge pumps CPi.

As an example, when the circuit 202 has to increase or decrease the number of enabled charge pumps CPi, it accordingly updates its signal EN.

As an example, in order to compare the thresholds Vth1 and Vth2 with the current value of the operating parameter of the charge pumps CPi which is adapted on the basis of the signal Err, the circuit 202 comprises two comparators (C). A first one of the two comparators compares the current value of the parameter (Vin in the example of FIG. 2) with the threshold Vth1 and a second one of the two comparators compares the current value of the parameter (Vin in the example of FIG. 2) with the threshold Vth2. Each of the two comparators outputs an output signal indicating the result of the comparison it implements. Still as an example, the circuit 202 further comprises a processing circuit (PROC) receiving the output signals of the two comparators, and delivering, on the basis of these signals, the signal EN indicating to each charge pump CPi whether it should be enabled or not. In other words, the signal EN selects the state of each charge pump CPi from the enabled state and the disabled state.

As an example, the charge pumps CPi of device 2 are organized into groups (or slices), for example into at least two groups, preferably into at least three groups. In this case, each charge pump CPi only belongs to a single of these groups. For example, in FIG. 2 the N=6 charge pumps CPi are organized into three groups of two charge pumps CPi, for example a first group comprising the charge pumps CP1 and CP2, a second group comprising the charge pumps CP3 and CP4, and a third group comprising the charge pumps CP5 and CP6.

According to an embodiment in which the charge pumps CPi are organized into groups, when the circuit 202 controls an increase in the number of enabled charge pumps CPi, the circuit 202 controls the simultaneous enabling, in addition to the charge pumps CPi already enabled, of all the charge pumps of at least one group, for example of a single group.

Conversely, when the circuit 202 controls a decrease in the number of enabled charge pumps CPi, the circuit 202 controls the simultaneous disabling, in addition to the charge pumps CPi already disabled, of all the charge pumps CPi of at least one group, for example of a single group.

As an alternative, upon each increase in the number of enabled charge pumps CPi by the circuit 202, the circuit 202 controls enabling a single charge pump CPi in addition to the already enabled ones, and, conversely, upon each decrease in the number of enabled charge pumps CPi by the circuit 202, this latter controls disabling a single charge pump CPi in addition to the already disabled ones.

As a further alternative embodiment, the number of further charge pumps CPi enabled upon each increase in the number of enabled charge pumps CPi by the circuit 202 can be different from the number of further charge pumps CPi disabled upon each decrease in the number of enabled charge pumps CPi by the circuit 202.

According to an embodiment, when the result of the comparisons of the current value of the operating parameter of the charge pumps CPi with the thresholds Vth1 and Vth2 indicates to circuit 202 that the number of enabled charge pumps CPi should be increased, that is when the result of the comparisons corresponds to an increase in the number of enabled charge pumps CPi, the circuit 202 is configured to launch a delay Temp1 and to implement, i.e., to control, the increase in the number of enabled charge pumps CPi at the end of the delay Temp1 only if the result of the comparisons at the end of the delay Temp1 did not change as compared to that at the beginning of the delay Temp1.

As an alternative, when the result of the comparisons of the current value of the operating parameter of the charge pumps CPi with the thresholds Vth1 and Vth2 indicates to the circuit 202 that the number of enabled charge pumps CPi should be increased, the circuit 202 instantly controls the increase in the number of enabled charge pumps CPi, without delay Temp1.

According to an embodiment, when the result of the comparisons of the current value of the operating parameter of the charge pumps CPi with the thresholds Vth1 and Vth2 indicates to circuit 202 that the number of enabled charge pumps CPi should be decreased, that is when the result of the comparisons corresponds to a decrease in the number of enabled charge pumps CPi, the circuit 202 is configured to launch a delay Temp2 and to implement, that is to control, the decrease in the number of enabled charge pumps CPi at the end of the delay Temp2 only if the result of the comparisons at the end of the delay Temp2 was unchanged as compared to that at the beginning of delay Temp2.

As an alternative, when the result of the comparisons of the current value of the operating parameter of the charge pumps CPi with the thresholds Vth1 and Vth2 indicates to the circuit 202 that the number of enabled charge pumps CPi should be decreased, the circuit 202 instantly controls the decrease in the number of enabled charge pumps CPi, without delay Temp2.

In some embodiments, the circuit 202 implements both delays Temp1 and Temp2. In other embodiments, the circuit 202 implements none of the delays Temp1 and Temp2. In some further embodiments, the circuit 202 implements only one of the two delays Temp1 and Temp2.

In a specific embodiment, the circuit 202 implements only delay Temp2. The lack of delay Temp1 allows the device 2 to instantly react to an increase in the consumption of the load, that allows a too much drop of the voltage Vout. In such case, providing the delay Temp2 allows instabilities of the device 2 to be avoided, that is alternate successive close increases and decreases of the number of enabled charge pumps CPi.

In the example of FIG. 2, the operating parameter of the charge pumps CPi being adapted based on the signal Err and the current value of which is compared with thresholds Vth1 and Vth2 is the voltage Vin. Thus, the circuit 202 receives a signal representative of (or indicating) the value of the voltage Vin. For example, the circuit 202 directly receives the voltage Vin as illustrated in FIG. 2. As an alternative embodiment, the circuit 202 receives a signal, for example a voltage, the value of which being determined by that of the voltage Vin, for example an output voltage of a voltage divider bridge supplied by the voltage Vout.

Figure 4:
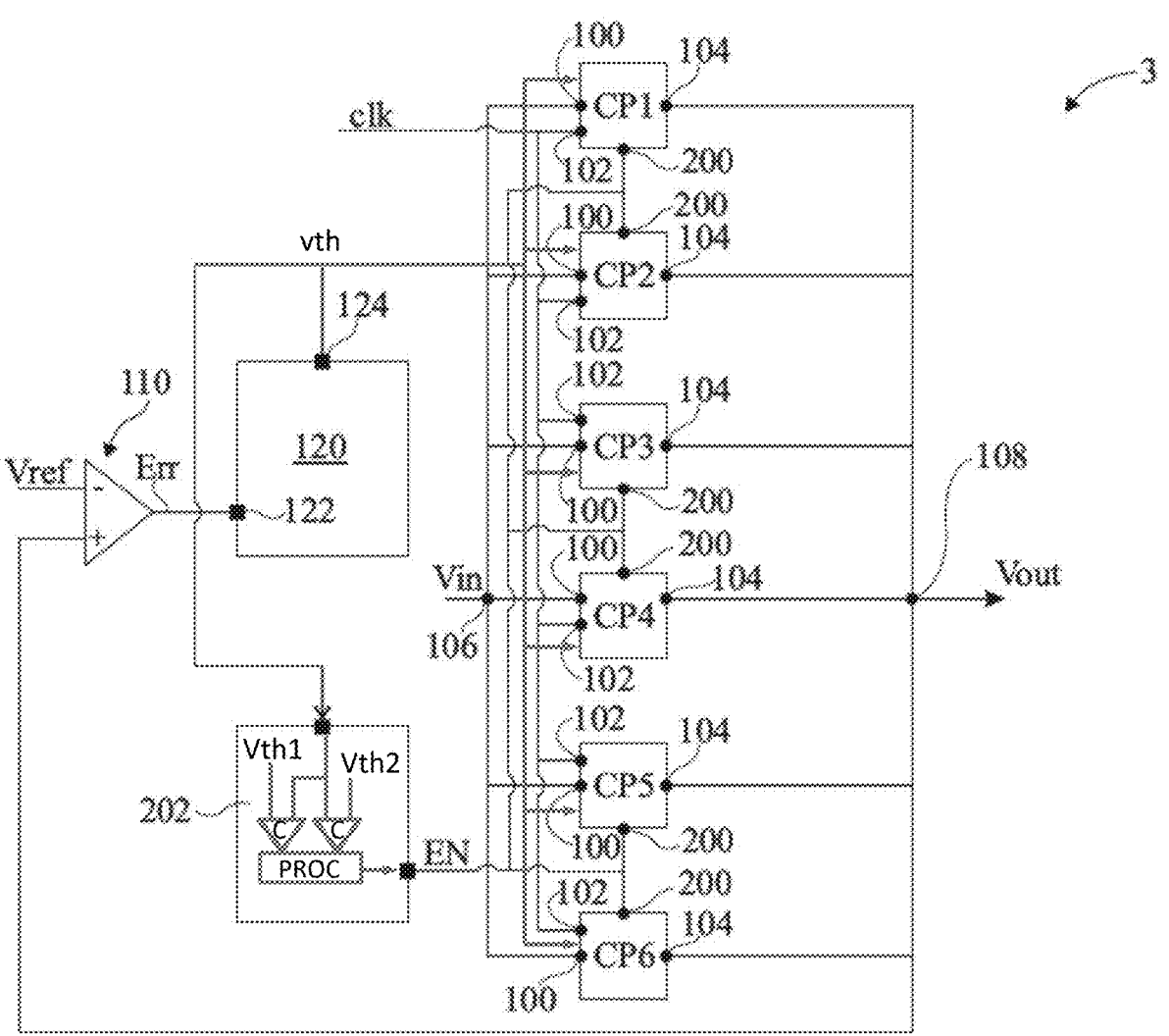
Figure 5:
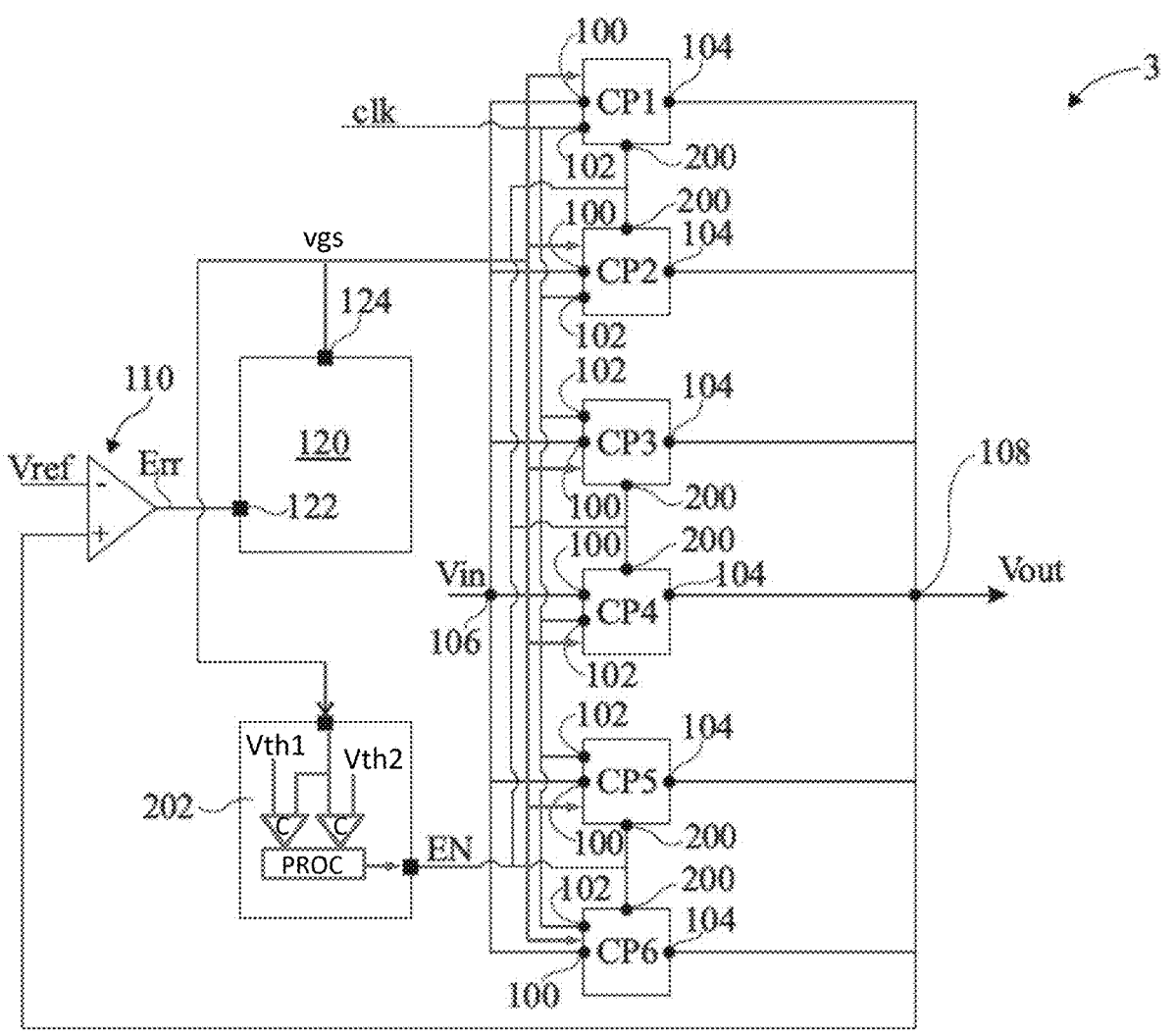

Although the example in FIG. 2 illustrates the case where the operating parameter of the charge pumps CPi which is adapted based on the signal Err and the current value of which is compared with the thresholds Vth1 and Vth2 is the voltage Vin, in other examples, this parameter can be the frequency of the signal clk for controlling the switching into the charge pumps Cpi (see, FIG. 3), the threshold (vth) of MOS transistors implementing the switching into the charge pumps Cpi (see, FIG. 4), or even the values of the gate-source voltages (vgs) corresponding to the OFF and ON states of these MOS transistors (see, FIG. 5). Indeed, in other example embodiments, the circuit 120 is configured to adapt the value of the thresholds of the MOS transistors implementing the switching into the charge pumps CPi, for example by adapting a back gate voltage of these transistors, for example so that the value of this threshold is decreased when the voltage Vout is less than the voltage Vref and moves away from this voltage Vref, and so that the value of this threshold is increased when the voltage Vout is higher than the voltage Vref and moves away from the voltage Vref. In this case, the signal indicating the current value of the threshold of these MOS transistors is, for example, a back gate voltage of these transistors allowing the value of the threshold of these transistors to be modulated. In even further example embodiments, the circuit 120 is configured to adapt the value of the gate-source voltage of the MOS transistors implementing the switching into the charge pumps CPi corresponding to an OFF state of these transistors and/or the value of this gate-source voltage corresponding to an ON state of these transistors, for example so as to increase or decrease the time needed to charge and/or discharge the gate capacitance of the transistors so as to increase or decrease the maximum quantity of the current delivered by the device 2 to a load over one period of the signal clk.

More generally, the operating parameter of the charge pumps CPi that is adapted based on the signal Err and the current value of which is compared with the thresholds Vth1 and Vth2 is selected from a group comprising the voltage Vin, the frequency of the signal clk, the threshold of the MOS transistors implementing the switching into the charge pumps CPi, and the levels of the gate-source voltage of these transistors. In other words, the operating parameter of the charge pumps CPi which is adapted according to the signal Err and the current value of which is compared with the thresholds Vth1 and Vth2 is a parameter representative of the current, or instant, power consumption of the load connected to the node 108 of the device 2.

Figure 3:
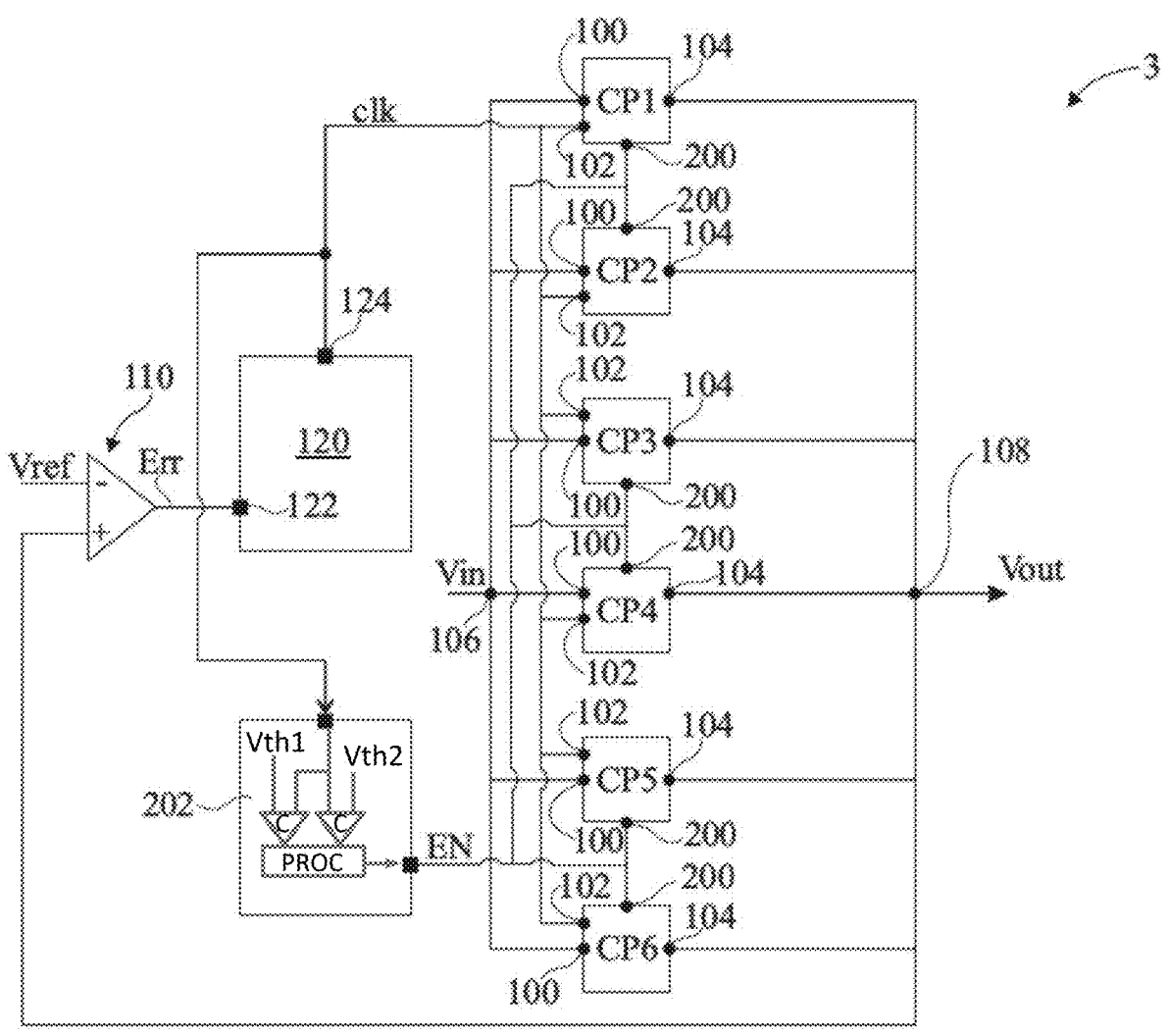
FIGS. 3, 4 and 5 schematically illustrate in part in block form, further example embodiments of a charge pump device.

FIGS. 3, 4 and 5 schematically illustrate in part in block form, further example embodiments of a device 3 having a charge pump.

Device 3 is similar to the previously described device 2, and only the differences between these two devices 2 and 3 are herein highlighted. Thus, unless indicated otherwise, all that was indicated for the device 2 applies to device 3.

As compared to device 2 in which the operating parameter of the charge pumps CPi the current value of which is compared with the thresholds Vth1 and Vth2 is the voltage Vin, in the device 3, this parameter is the frequency of the signal clk for controlling the charge pumps CPi. In such case, the voltage Vin is preferably constant.

As compared to device 2, the circuit 120 of the device 3 is thus not configured to increase, respectively decrease, the voltage Vin when the voltage Vout goes less than the voltage Vref, respectively higher than the voltage Vref. In the device 3 shown in FIG. 3, the circuit 120 is configured to increase, respectively decrease, the frequency of the signal clk when the voltage Vout goes less than the voltage Vref, respectively higher than the voltage Vref. In the device 3 shown in FIG. 4, the circuit 120 is configured to increase, respectively decrease, the threshold voltage vth of the MOS transistors of the charge pump circuits Cpi dependent on the comparison of the voltage Vout to the voltage Vref. In the device 3 shown in FIG. 5, the circuit 120 is configured to increase, respectively decrease, the gate to source voltage vgs for ON/OF states of the MOS transistors of the charge pump circuits Cpi dependent on the comparison of the voltage Vout to the voltage Vref.

Thus, in the device 3 the output 124 of the circuit 120 is not connected to the node 106 and does not deliver the voltage Vin. Indeed, the output 124 then controls the frequency of the signal clk. For example, the output 124 of the circuit 120 delivers the signal clk as illustrated in FIG. 3. As an alternative example, the output 124 of the circuit 120 delivers a control signal indicating a target value of the frequency of the signal clk, this signal being received by a circuit for generating the signal clk configured so that the value of the frequency of the signal clk it delivers is equal to the target value indicated by the control signal. Or, the output 124 controls the MOS transistor threshold voltage vth (as illustrated in FIG. 4) or the MOS transistor gate to source voltage vgs (as illustrated in FIG. 5).

Further, as compared to the circuit 202 of the device 2, the circuit 202 of the device 3 is configured to receive a signal indicating the same the current value of the frequency of the signal clk. For example, the circuit 202 of the device 3 receives the signal clk and is configured to determine the value of the frequency of this received signal clk. As an alternative example, the circuit 202 receives a signal indicating the current value of the frequency of the signal clk, for example a control signal delivered by the circuit 120 of the device 3 to a circuit for generating the signal clk, and indicating the value of the frequency of the signal clk that the generating circuit has to deliver. As another alternative example, the circuit 120 directly delivers the signal clk, and further delivers a signal to the circuit 202 indicating the same the current value of the frequency of the signal clk. Or, the circuit 202 receives the threshold voltage vth control signal (as illustrated in FIG. 4) or gate to source voltage vgs control signal (as illustrated in FIG. 5).

In the device 3, as for the voltage Vin in the device 2, when the value of the frequency of the signal clk increases, this indicates that the consumption of the load supplied by the voltage Vout is too high for the number of enabled charge pumps CPi, and, conversely, when the value of the frequency of the signal clk decreases, this indicates that the load supplied by the voltage Vout does not consume enough for the number of enabled charge pumps CPi.

Thus, in the device 3, if the current value of the frequency of the signal clk is higher than the thresholds Vth1 and Vth2, that means that the load consumes too much for the number of enabled charge pumps CPi, and the circuit 202 then controls an increase in this number of enabled charge pumps CPi. Conversely, if the current value of the frequency of the signal clk is less than the thresholds Vth1 and Vth2, that means that the device 3 delivers too much power to the load as compared to the consumption of this latter, and the circuit 202 then controls a decrease in the number of enabled charge pumps CPi. In the case where the number of enabled charge pumps is adapted to the consumption of the load, the voltage Vout has little changes as compared to the voltage Vref, resulting in the current value of the voltage Vin being relatively constant, and remaining comprised between the thresholds Vth1 and Vth2, the circuit 202 then not changing the number of enabled charge pumps CPi.

In the hereinabove described examples of FIGS. 2-3, the circuit 120 is configured to increase the value of the operating parameter of the charge pumps (voltage Vin in FIG. 2, the frequency of signal Clk in FIG. 3) when the voltage Vout is less than the voltage Vref and moves away from this latter, and to decrease the value of this parameter when the voltage Vout is higher than the voltage Vref and moves away from the voltage Vref.

However, according to the operating parameter that the circuit 120 adapts on the basis of the signal Err, the circuit 120 is configured to decrease the value of this parameter when the voltage Vout is less than the voltage Vref and moves away from this latter, and to increase the value of this parameter when the voltage Vout is higher than the voltage Vref and moves away from the voltage Vref. In such case: if the current value of this parameter is less than the thresholds Vth1 and Vth2, it means that the load consumes too much for the number of enabled charge pumps CPi, and the circuit 202 then controls an increase in the number of enabled charge pumps Cpi; if the current value of this parameter is higher than the thresholds Vth1 and Vth2, it means that the enabled charge pumps CPi deliver too much power to the load as compared to the consumption of this latter, and the circuit 202 then controls a decrease in the number of enabled charge pumps Cpi; and if the current value of the parameter is comprised between the thresholds Vth1 and Vth2, it means that the number of enabled charge pumps is adapted to the consumption of the load, and the circuit 202 then does not change the number of enabled charge pumps CPi.

In the above-described example embodiments and example alternative devices having charge pump, although it was never indicated as it appears obvious to those skilled in the art, when the result of the comparisons of the thresholds Vth1 and Vth2 with the current value of the operating parameter of the charge pumps CPi indicates to the circuit 202 that it should increase the number of enabled charge pumps, the implementation of this increase in the number of enabled charge pumps by the circuit 202 is possible only if it remains at least one disabled charge pump CPi from the N charge pumps CPi. Symmetrically, although it was never indicated as it appears obvious to those skilled in the art, when the result of the comparisons of the thresholds Vth1 and Vth2 with the current value of the operating parameter of the charge pumps CPi indicates to the circuit 202 that it should decrease the number of enabled charge pumps, the implementation of this increase in the number of enabled charge pumps by the circuit 202 is possible only if it remains at least one enabled charge pump CPi from the N charge pumps CPi once the decrease in the number of enabled charge pumps implemented.

However, practically, the case where the number of enabled charge pumps should be increased as the N charge pumps CPi are already enabled should not occur if the number N was selected so as to guarantee a convenient supply of the load connected to the node 108 whatever the PVT conditions.

According to an embodiment as shown in FIG. 6, a charge pump device of the type of those previously described in relation with FIGS. 2-3 is implemented into a light sensor, for example a time-of-flight sensor. The sensor comprises an array of pixels having each one single photon avalanche photodiode (SPAD). The device is then configured to supply the array of pixels, for example each pixel of the array, for example each SPAD of the sensor.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove. In particular, those skilled in the art has the ability, based on the hereinabove functional disclosure, to implement the circuits 110, 120, and 202.

The invention claimed is:

1. A device, comprising:
a plurality of charge pumps wherein each charge pump has a first input connected to a first node configured to receive an input voltage, a second input configured to receive a periodic control signal for controlling the switching into the charge pumps and an output connected to a second node configured to deliver an output voltage, and wherein each charge pump is configured to be selectively enabled or disabled;
a first circuit configured to deliver a signal indicating an offset between the output voltage and a reference voltage;
a second circuit configured to change an operating parameter of said charge pumps on the basis of said signal; and
a third circuit configured to compare a current value of said operating parameter with a first threshold and with a second threshold, and, based on the result of the comparisons, to control one among an increase in a number of enabled charge pumps, a decrease in the number of enabled charge pumps, and a retention of the number of enabled charge pumps;
wherein said operating parameter comprises a frequency of the control signal applied to all charge pumps of the plurality of charge pumps.

2. The device according to claim 1, wherein the third circuit is configured to control:
an increase in the number of enabled charge pumps when the result of the comparisons indicates that the current value is on a first same side of said first and second thresholds;
a retention of the number of enabled charge pumps if the result of the comparisons indicates that the current value is comprised between the first and second thresholds; and
a decrease in the number of enabled charge pumps if the result of the comparisons indicates that the current value is on a second same side of said first and second thresholds.

3. The device according to claim 2, wherein the third circuit comprises a first comparator for comparing the current value of said operating parameter with the first threshold, a second comparator for comparing the current value of said operating parameter with the second threshold, and a processing circuit configured to receive an output signal of each of the first and second comparators and to deliver, on the basis of these output signals, a signal selecting a state of each of the charge pumps among the enabled state and the disabled state.

4. The device according to claim 1, wherein the third circuit being configured to control:

an increase in the number of enabled charge pumps if the result of the comparisons indicates that the current value is higher than the first and second thresholds;

a retention of the number of enabled charge pumps if the result of the comparisons indicates that the current value is comprised between the first and second thresholds; and a decrease in the number of enabled charge pumps if the result of the comparisons indicates that the current value is less than the first and second thresholds.

5. The device according to claim 1, wherein the input voltage being constant and the same for all charge pumps.

6. The device according to claim 5, wherein the second circuit is configured to increase the frequency if the output voltage is less than the reference voltage, and to decrease the frequency if the output voltage is higher than the reference voltage.

7. The device according to claim 1, wherein the third circuit is configured, when the result of the comparisons corresponds to an increase in the number of enabled charge pumps, to apply a first delay, and to control said increase at the end of the first delay only if the result of the comparisons is the same as at the start of the first delay.

8. The device according to claim 1, wherein the third circuit is configured, when the result of the comparisons corresponds to a decrease in the number of enabled charge pumps, to apply a second delay, and to control said decrease at the end of the second delay only if the result of the comparisons is the same at the start of the second delay.

9. A time-of-flight sensor, comprising:

the device according to claim 1; and an array of pixels comprising each a single photon avalanche diode;

wherein the device is configured to supply the pixel array with the output voltage thereof.

10. A device, comprising:

a plurality of charge pumps wherein each charge pump has a first input connected to a first node configured to receive an input voltage, a second input configured to receive a periodic control signal for controlling the switching into the charge pumps and an output connected to a second node configured to deliver an output voltage, and wherein each charge pump is configured to be selectively enabled or disabled;

a first circuit configured to deliver a signal indicating an offset between the output voltage and a reference voltage;

a second circuit configured to change an operating parameter of said charge pumps on the basis of said signal; and a third circuit configured to compare a current value of said operating parameter with a first threshold and with a second threshold, and, based on the result of the comparisons, to control one among an increase in a number of enabled charge pumps, a decrease in the number of enabled charge pumps, and a retention of the number of enabled charge pumps;

wherein said operating parameter comprises a threshold of MOS transistors configured to implement switching in each of the charge pumps.

11. The device according to claim 10, wherein the third circuit is configured to control:

an increase in the number of enabled charge pumps when the result of the comparisons indicates that the current value is on a first same side of said first and second thresholds;

a retention of the number of enabled charge pumps if the result of the comparisons indicates that the current value is comprised between the first and second thresholds; and a decrease in the number of enabled charge pumps if the result of the comparisons indicates that the current value is on a second same side of said first and second thresholds.

12. The device according to claim 11, wherein the third circuit comprises a first comparator for comparing the current value of said operating parameter with the first threshold, a second comparator for comparing the current value of said operating parameter with the second threshold, and a processing circuit configured to receive an output signal of each of the first and second comparators and to deliver, on the basis of these output signals, a signal selecting a state of each of the charge pumps among the enabled state and the disabled state.

13. The device according to claim 10, wherein the third circuit is configured, when the result of the comparisons corresponds to an increase in the number of enabled charge pumps, to apply a first delay, and to control said increase at the end of the first delay only if the result of the comparisons is the same as at the start of the first delay.

14. The device according to claim 10, wherein the third circuit is configured, when the result of the comparisons corresponds to a decrease in the number of enabled charge pumps, to apply a second delay, and to control said decrease at the end of the second delay only if the result of the comparisons is the same at the start of the second delay.

15. A time-of-flight sensor, comprising:

the device according to claim 10; and an array of pixels comprising each a single photon avalanche diode;

wherein the device is configured to supply the pixel array with the output voltage thereof.

16. A device, comprising:

a plurality of charge pumps wherein each charge pump has a first input connected to a first node configured to receive an input voltage, a second input configured to receive a periodic control signal for controlling the switching into the charge pumps and an output connected to a second node configured to deliver an output voltage, and wherein each charge pump is configured to be selectively enabled or disabled;

a first circuit configured to deliver a signal indicating an offset between the output voltage and a reference voltage;

a second circuit configured to change an operating parameter of said charge pumps on the basis of said signal; and a third circuit configured to compare a current value of said operating parameter with a first threshold and with a second threshold, and, based on the result of the comparisons, to control one among an increase in a number of enabled charge pumps, a decrease in the number of enabled charge pumps, and a retention of the number of enabled charge pumps;

wherein said operating parameter comprises a gate-source voltage level of MOS transistors configured to implement switching in each of the charge pumps.

17. The device according to claim 16, wherein the third circuit is configured to control:

an increase in the number of enabled charge pumps when the result of the comparisons indicates that the current value is on a first same side of said first and second thresholds;

a retention of the number of enabled charge pumps if the result of the comparisons indicates that the current value is comprised between the first and second thresholds; and a decrease in the number of enabled charge pumps if the result of the comparisons indicates that the current value is on a second same side of said first and second thresholds.

18. The device according to claim 17, wherein the third circuit comprises a first comparator for comparing the current value of said operating parameter with the first threshold, a second comparator for comparing the current value of said operating parameter with the second threshold, and a processing circuit configured to receive an output signal of each of the first and second comparators and to deliver, on the basis of these output signals, a signal selecting a state of each of the charge pumps among the enabled state and the disabled state.

19. The device according to claim 16, wherein the third circuit is configured, when the result of the comparisons corresponds to an increase in the number of enabled charge pumps, to apply a first delay, and to control said increase at the end of the first delay only if the result of the comparisons is the same as at the start of the first delay.

20. The device according to claim 16, wherein the third circuit is configured, when the result of the comparisons corresponds to a decrease in the number of enabled charge pumps, to apply a second delay, and to control said decrease at the end of the second delay only if the result of the comparisons is the same at the start of the second delay.

21. A time-of-flight sensor, comprising:
the device according to claim 16; and
an array of pixels comprising each a single photon avalanche diode;
wherein the device is configured to supply the pixel array with the output voltage thereof.

* * * * *